(12) United States Patent
Hsu

(10) Patent No.: US 9,309,906 B2
(45) Date of Patent: Apr. 12, 2016

(54) SELF-DRILLING EXPANSION FASTENER AND METHOD OF FORMING SAME

(71) Applicant: Fu-Chuan Hsu, Taoyuan Hsien (TW)

(72) Inventor: Fu-Chuan Hsu, Taoyuan Hsien (TW)

( * ) Notice: Subject to any disclaimer, the term of this patent is extended or adjusted under 35 U.S.C. 154(b) by 207 days.

(21) Appl. No.: 14/083,641

(22) Filed: Nov. 19, 2013

(65) Prior Publication Data

US 2015/0139747 A1 May 21, 2015

(51) Int. Cl.
  *F16B 13/04* (2006.01)
  *F16B 5/06* (2006.01)
  *F16B 13/00* (2006.01)
  *F16B 13/08* (2006.01)

(52) U.S. Cl.
  CPC ............. *F16B 5/0642* (2013.01); *F16B 13/003* (2013.01); *F16B 13/0808* (2013.01)

(58) Field of Classification Search
  CPC ............... F16B 2013/10; F16B 13/002; F16B 13/0061; F16B 5/0642; F16B 25/103; F16B 13/003; F16B 5/00; F16B 13/061
  USPC ............................................ 411/34
  See application file for complete search history.

(56) References Cited

U.S. PATENT DOCUMENTS

| | | | | |
|---|---|---|---|---|
| 1,084,458 A * | 1/1914 | Malaby | ................. | F16B 13/061 411/36 |
| 3,304,830 A * | 2/1967 | Shackelford | ........ | B25B 27/0007 29/524.1 |
| 3,385,156 A * | 5/1968 | Polos | .................... | F16B 13/002 411/30 |
| 3,437,004 A * | 4/1969 | Pacharis | ................ | F16B 13/061 411/29 |
| 3,797,358 A * | 3/1974 | Allender | ............... | F16B 37/067 411/38 |
| 4,617,692 A * | 10/1986 | Bond | ..................... | B23B 51/08 408/241 R |
| 5,147,166 A * | 9/1992 | Harker | ................. | F16B 13/001 411/29 |
| 5,190,425 A * | 3/1993 | Wieder | ................. | F16B 13/002 411/29 |
| 5,246,323 A * | 9/1993 | Vernet | ................... | F16B 13/061 411/183 |
| 5,807,050 A * | 9/1998 | Daler | .................... | F16B 13/122 411/36 |
| 2005/0013677 A1* | 1/2005 | Anquetin | .............. | F16B 13/001 411/38 |
| 2008/0292423 A1* | 11/2008 | Lin | ....................... | F16B 13/003 411/31 |

* cited by examiner

*Primary Examiner* — Gary Estremsky
(74) *Attorney, Agent, or Firm* — Rosenberg, Klein & Lee

(57) ABSTRACT

A self-drilling expansion fastener is integrally formed of a sheet metal material for locking two or more sheet workpieces together, and includes an expansion structure and a drill structure. The expansion structure has a plurality of internal threads and force-distributing bars. The drill structure has a chip guard for covering a head of the expansion structure, and a drill forward projected from the chip guar for self-drilling a hole. When an externally threaded element is screwed into the expansion structure to mesh with the internal threads, the force-distributing bars are brought to expand outward and are finally compressed into a folded state to thereby tightly lock the sheet workpieces to one another. A method of forming the self-drilling expansion fastener is also disclosed.

6 Claims, 8 Drawing Sheets

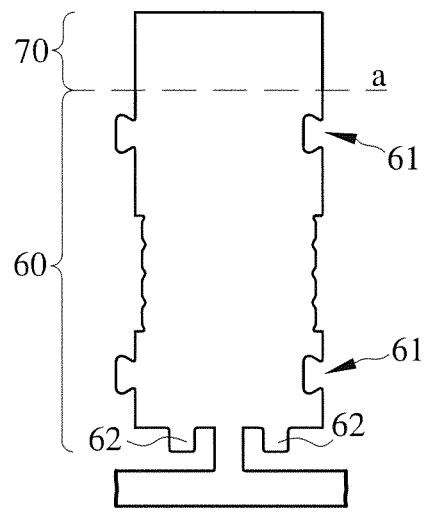
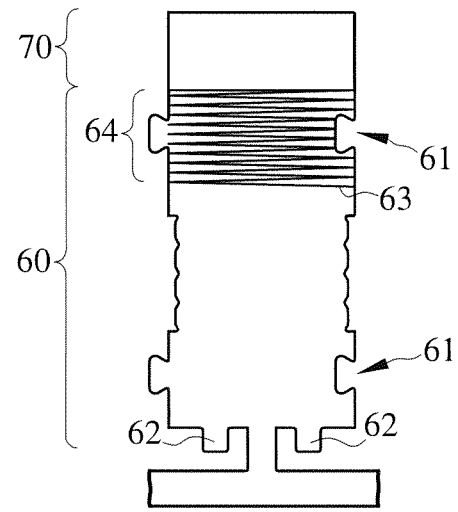
FIG. 8A                FIG. 8B
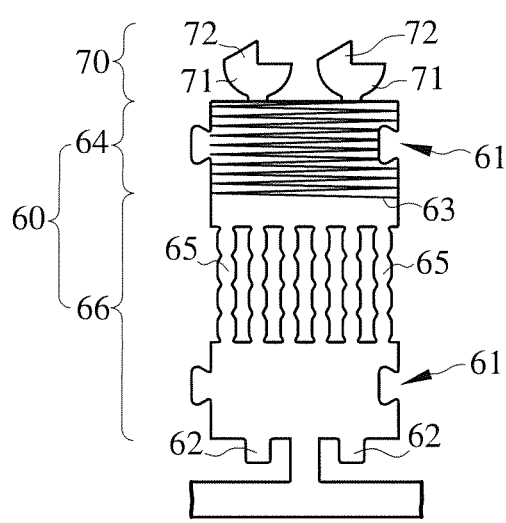
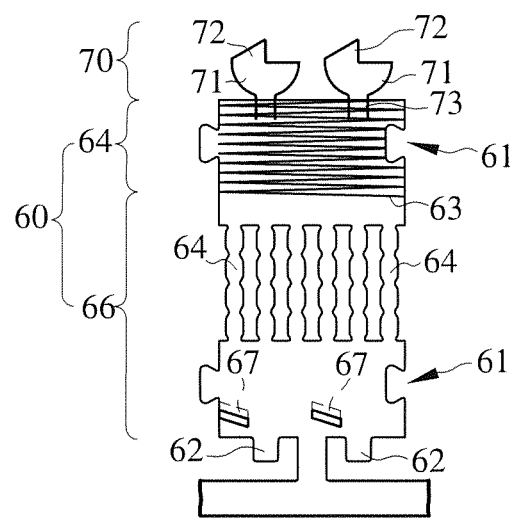
FIG. 8C                FIG. 8D

SELF-DRILLING EXPANSION FASTENER AND METHOD OF FORMING SAME

FIELD OF THE INVENTION

The present invention relates to an expansion fastener integrally formed of a sheet metal material, and more particularly to an expansion fastener capable of self-drilling a hole.

BACKGROUND OF THE INVENTION

An expansion fastening device is usually used to fixedly connect multiple sheet workpieces, such as building panels, to one another, and includes a bolt and an expansion fastener. FIG. 1 shows a typical conventional expansion fastener 10, which includes a barrel body 11 having a plurality of longitudinally extended elongated slots 12 formed thereon to define a plurality of laterally spaced middle bars 13; a nut 14 connected to a head of the barrel body 11; and a bottom cover 15 connected to a bottom of the barrel body 11. As shown in FIG. 2, a bolt 16 can be extended through the bottom cover 15 and the barrel body 11 of the expansion fastener 10 to mesh with the nut 14. When the barrel body 11 is subjected to a pull, the middle bars 13 are brought to expand outward and become deformed. The deformed middle bars 13 and the bolt 16 together lock an attached object 17 to a supporting object 18.

The conventional expansion fastener 10 is disadvantageous in terms of assembling and installation thereof. First, the nut 14 and the bottom cover 15 are connected to the barrel body 11 by welding, which is time and labor consuming to result in high manufacturing cost of the expansion fastener 10. Second, two steps are required to install the conventional expansion fastener 10 on a sheet workpiece, such as a panel or a board. That is, a hole having size corresponding to the expansion fastener 10 must first be drilled on the supporting object 18; and then, the barrel body 11 is driven into the hole with a hammer, for example, so that the barrel body 11 is tightly fitted in the hole without the risk of rotating relative to the supporting object 18. The above installation is apparently troublesome and consumes a lot of time and labor. It is therefore desirable to overcome these disadvantages.

SUMMARY OF THE INVENTION

A primary object of the present invention is to provide a self-drilling expansion fastener, with which a user can lock two or more sheet workpieces together with only one installation step to largely simplify the working procedure and upgrade the working efficiency.

Another object of the present invention is to provide a method of integrally forming a self-drilling expansion fastener from a sheet metal material through a series of punching and stamping procedures, so that the self-drilling expansion fastener can be easily manufactured with upgraded production efficiency.

To achieve the above and other objects, the self-drilling expansion fastener according to the present invention is integrally formed of a sheet metal material for locking two or more sheet workpieces together, and includes an expansion structure and a drill structure located at a head of the expansion structure. The expansion structure has a plurality of internal threads and a plurality of force-distributing bars. The drill structure has a chip guard for covering the head of the expansion structure, and a drill forward projected from the chip guard for self-drilling a hole on the sheet workpieces, so that the expansion structure can be extended through the sheet workpieces and tightly received in the drilled hole with the force-distributing bars fully located behind the sheet workpieces. When an externally threaded element is gradually screwed deeper into the expansion structure to mesh with the internal threads, the force-distributing bars are brought to expand outward and are finally compressed into a folded state to thereby tightly lock the sheet workpieces to one another.

To achieve the above and other objects, the method according to the present invention for integrally forming a self-drilling expansion fastener includes the following steps:
(a) obtaining a sheet metal material having dimensions required for forming the self-drilling expansion fastener, and defining an expansion structure zone and a drill structure zone on the obtained sheet metal material;
(b) stamping the expansion structure zone at a specified location, which is defined as a thread forming zone, to obtain threads having required dimensions;
(c) punching the expansion structure zone at a specified location, which is defined as a barrel body forming zone, to obtain a plurality of force-distributing bars;
(d) punching the drill structure zone at a predetermined location to obtain a required chip guard;
(e) punching the drill structure zone at a predetermined location to obtain a required drill; and
(f) stamping the thread forming zone and the barrel body forming zone to obtain required configurations for these two zones.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIGS. 8A to 8I sequentially illustrate the steps included in a method according to the present invention for forming the self-drilling expansion fastener.

DETAILED DESCRIPTION OF THE PREFERRED EMBODIMENTS

Figure 1:
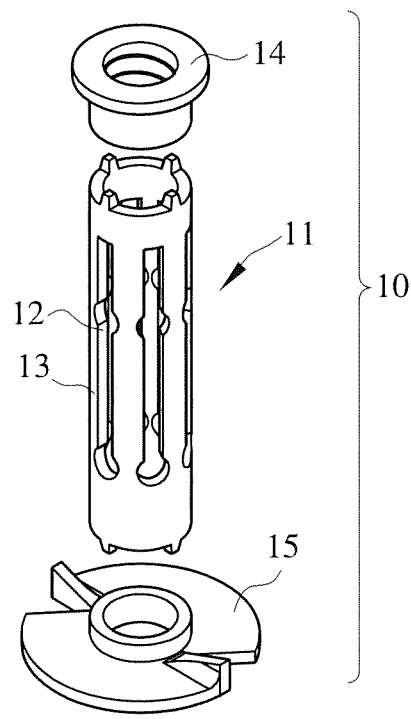
FIG. 1 is an exploded perspective view of a conventional expansion fastener.
Figure 2:
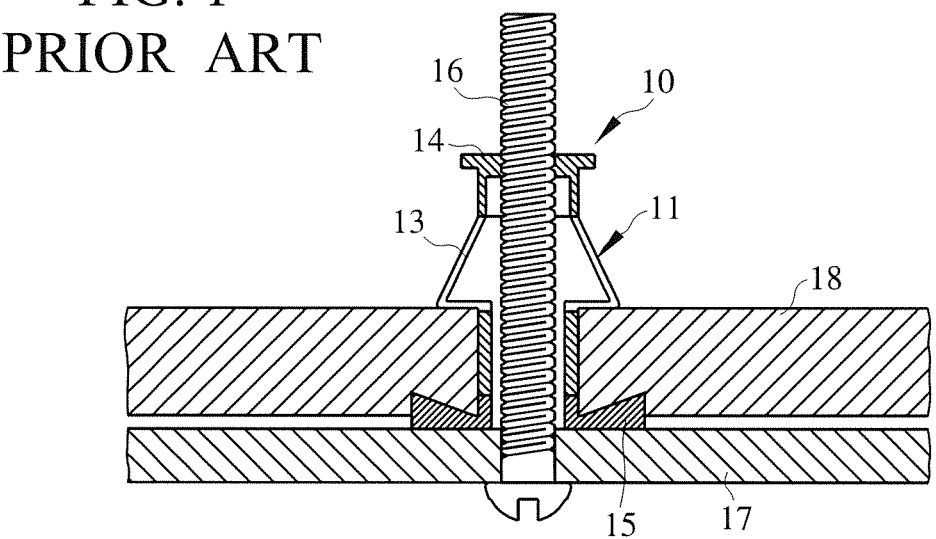
FIG. 2 is a sectional view showing the expansion fastener of FIG. 1 in use.

The present invention will now be described with a preferred embodiment thereof and with reference to the accompanying drawings.

Please refer to FIGS. 3 to 6. A self-drilling expansion fastener 20 according to a preferred embodiment of the present invention is integrally formed of a sheet metal material, and includes an expansion structure 21 and a drill structure 30 located at a head of the expansion structure 21. The expansion structure 21 has a front portion formed into an internally threaded body portion 22 and a rear portion formed into a barrel body portion 23. The internally threaded body portion 22 is a cylindrical hollow body and defines a plurality of internal threads 24.

Figures 5, 6:
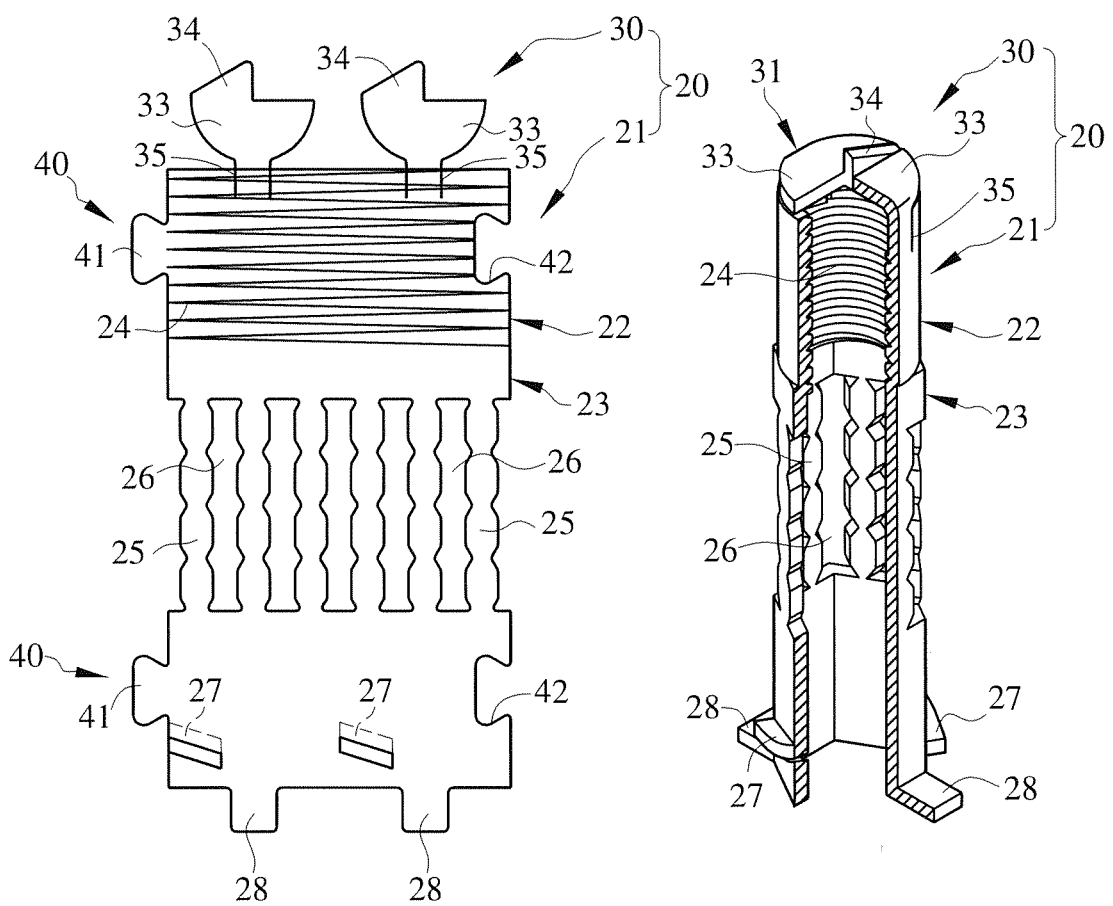
FIG. 5 is a developed view of the self-drilling expansion fastener of FIG. 3.
FIG. 6 is a cutaway view of the self-drilling expansion fastener of FIG. 3.

The barrel body portion 23 is a hexagonal hollow body and internally defines a hex bore. The barrel body portion 23 includes a plurality of laterally spaced force-distributing bars 25. Once the barrel body portion 23 is subjected to an axial pull, stress occurs at the force-distributing bars 25. In other words, the force-distributing bars 25 together form a weakening zone. In the preferred embodiment as shown in FIG. 5, there are six axially extended force-distributing bars 25 being laterally equally spaced on the barrel body portion 23, such that a spacing slot 26 is formed between any two adjacent force-distributing bars 25. Further, the barrel body portion 23 includes at least one retaining wing 27. In the illustrated preferred embodiment, as shown in FIG. 5, there are two retaining wings 27 formed on the barrel body portion 23 by stamping, so that these retaining wings 27 are outward protruded from a wall surface of the barrel body portion 23 and are slant at a fixed angle relative to a horizontal rear end of the barrel body portion 23. And, the barrel body portion 23 includes at least one stopper 28 formed on the rear end thereof.

Again, as can be seen in FIG. 5, the illustrated preferred embodiment of the present invention has two diametrically opposite stoppers 28, which are respectively upward bent from the rear end of the barrel body portion 23 to a sidewardly projected position.

Figure 3:
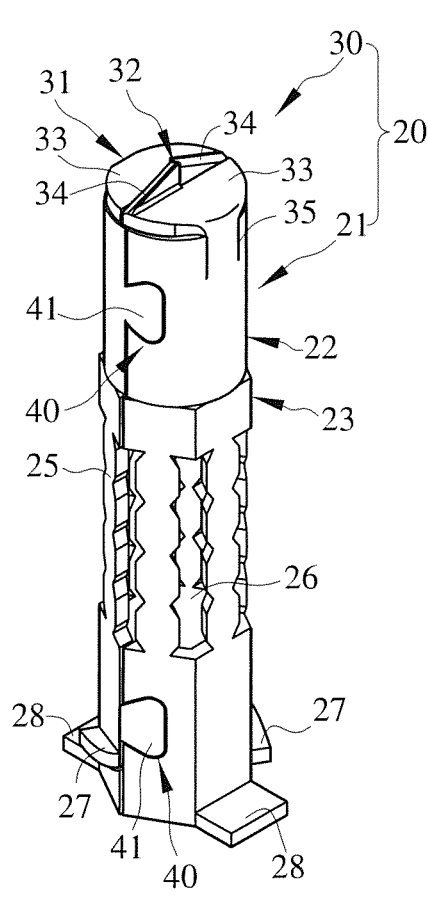
FIG. 3 is a perspective view of a self-drilling expansion fastener according to a preferred embodiment of the present invention.
Figure 4:
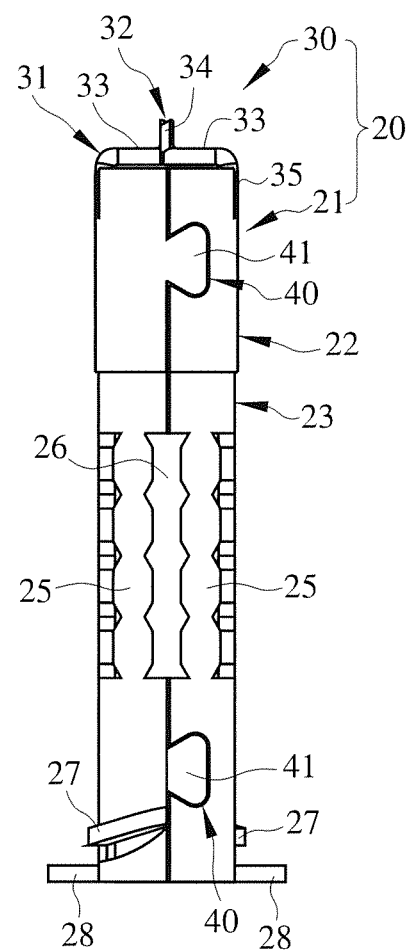
FIG. 4 is a front plan view of the self-drilling expansion fastener of FIG. 3.

The drill structure 30 includes a chip guard 31 and a drill 32. As can be seen in FIG. 3, the chip guard 31 includes two side covers 33, which are extended from the internally threaded body portion 22 and bent toward each other to together cover a front end of the internally threaded body portion 22. It is noted two slits 35 are formed at two lateral sides of the joint of each side cover 33 and the internally threaded body portion 22. The drill 32 consists of two drill bits 34, which are forward projected from top surfaces of the two side covers 33.

The expansion structure 21 further includes at least one coupling device 40, which consists of a lug portion 41 and a notch portion 42 correspondingly located opposite to the lug portion 41, such that the lug portion 41 and the notch portion 42 can be engaged with and locked to each other.

Figure 7A:
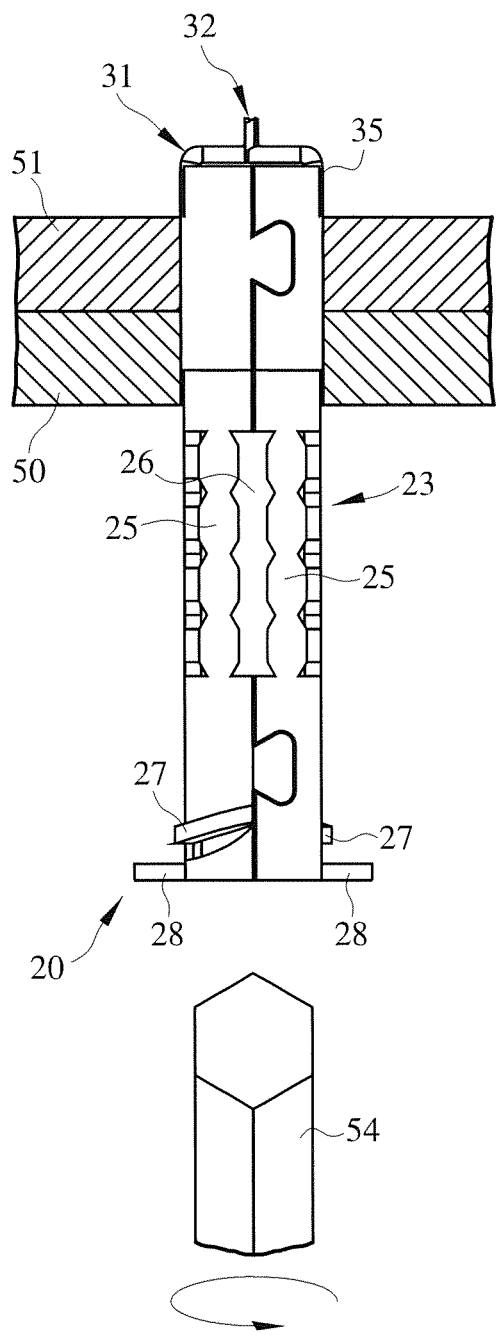
FIGS. 7A to 7C sequentially show the steps of installing the self-drilling expansion fastener of the present invention.
Figure 7B:
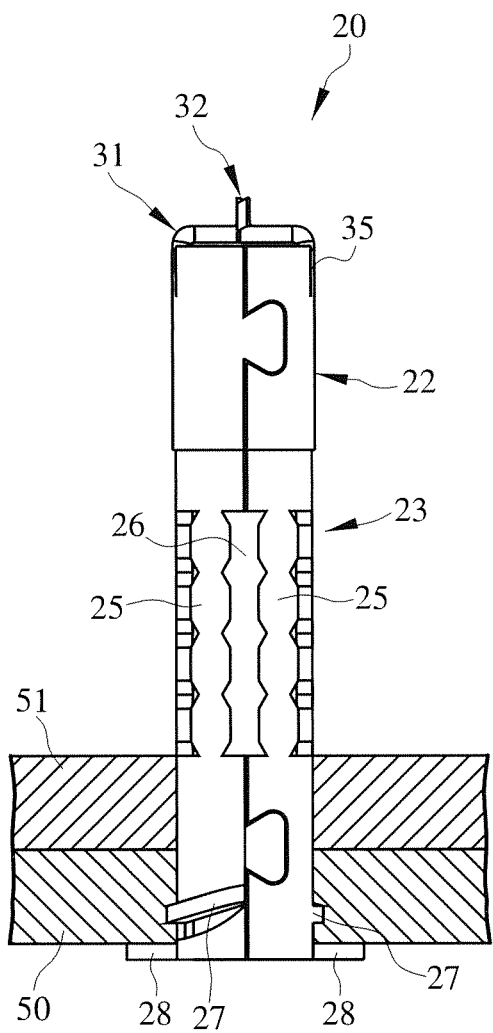
Figure 7C:
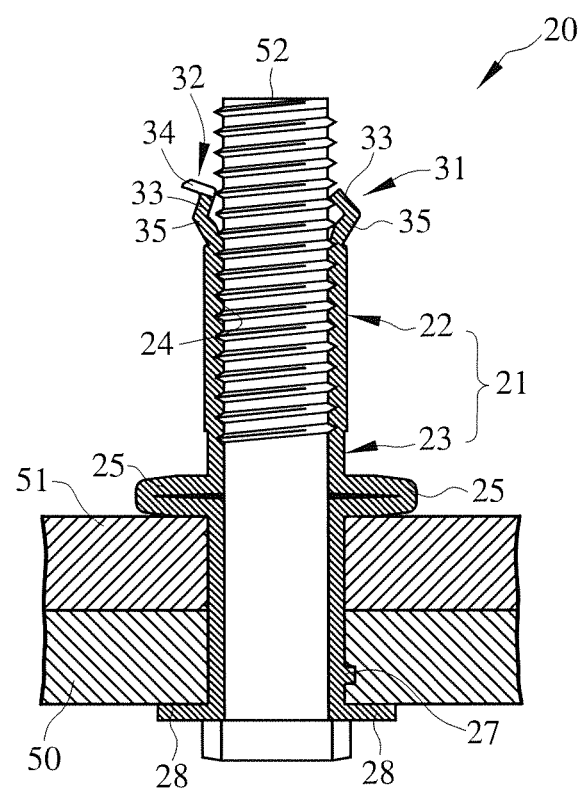

FIGS. 7A to 7C illustrate the steps of installing the self-drilling expansion fastener 20 on sheet workpieces. First, as shown in FIG. 7A, apply a rotating force on the barrel body portion 23 of the self-drilling expansion fastener 20, so that the drill 32 is brought to drill through multiple layers of sheet workpieces, such as an attached object 50 and a supporting object 51, for the stoppers 28 to tightly press against the attached object 50. In addition to the two layers of sheet worpieces shown in the embodiment, more than two layers may be fastened by the fastener of the invention. At this point, as shown in FIG. 7B, the force-distributing bars 25 are located behind the supporting object 51 and the retaining wings 27 are embedded in a peripheral wall of the drilled hole on the attached object 50, bringing the self-drilling expansion fastener 20 to firmly associate with the attached object 50 and the supporting object 51. In practical installation of the self-drilling expansion fastener 20, a matching hexagonal tool 54 can be inserted into the barrel body portion 23 to facilitate the rotation of the self-drilling expansion fastener 20, allowing the drill 32 to drill a hole on the attached object 50 and the supporting object 51. The chip guard 31 functions to prevent any chips of the workpieces 50, 51 from getting into the expansion structure 21. Thereafter, as shown in FIG. 7C, screw an externally threaded element 52 into the barrel body portion 23 to fully mesh with the internal threads 24 in the internally threaded body portion 22. When the externally threaded element 52 is gradually screwed deeper into the internally threaded body portion 22, the latter is gradually pulled backward to thereby compress the force-distributing bars 25, bringing the latter to expand outward and finally be compressed into a fully folded state. The fully folded force-distributing bars 25 are now tightly pressed against an inner side of the supporting object 51, allowing the self-drilling expansion fastener 20 to firmly lock the attached object 50 to the supporting object 51. At this point, the externally threaded element 52 has a front end extended beyond the drill 32 by a predetermined length to push open the side covers 33 of the chip guard 31, so that the drill bits 34 of the drill 32 are separated from one another.

In brief, the self-drilling expansion fastener 20 according to the present invention is integrally formed and has the ability of self-drilling a hole, and can therefore be manufactured with fewer components to reduce the production and installation costs thereof.

Figure 8G:
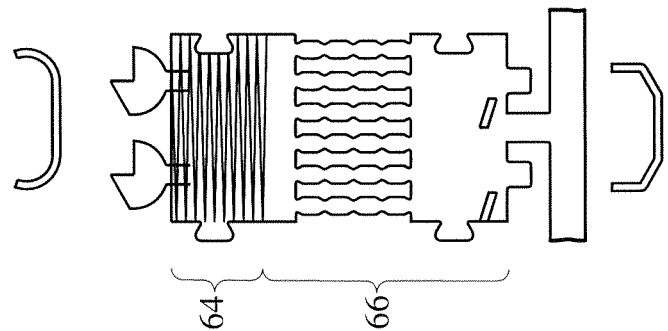

The self-drilling expansion fastener 20 according to the present invention is formed of a sheet metal material through a series of punching and stamping procedures. FIGS. 8A to 8I sequentially illustrate the steps included in a method of the present invention for forming the self-drilling expansion fastener 20. First, as shown in FIG. 8A, unnecessary portions are removed from a sheet metal raw material to obtain the sheet metal material having dimensions for forming the self-drilling expansion fastener 20; a reference line "a" is defined to determine an expansion structure zone 60 and a drill structure zone 70 on the obtained sheet metal material; and the expansion structure zone 60 is punched at a specified location to obtain at least one coupling device 61 and at a rear portion to obtain required stoppers 62. Then, as shown in FIG. 8B, the expansion structure zone 60 is stamped at a specified location, which is defined as a thread forming zone 64, to obtain required threads 63. Then, as shown in FIG. 8C, the expansion structure zone 60 is punched at a predetermined location, which is defined as a barrel body forming zone 66, to obtain a plurality of required force-distributing bars 65; and the drill structure zone 70 is punched at predetermined locations to obtain required side covers 71 and drill bits 72. Thereafter, as can be seen in FIG. 8D, the barrel body forming zone 66 is stamped at predetermined locations to obtain required retaining wings 67, and the thread forming zone 64 is punched at predetermined locations to obtain slits 73 at joints of the side covers 71 and the thread forming zone 64. Then, as shown in FIG. 8E, the stoppers 62, the side covers 71 and drill bits 72 are bent, so that the side covers 71 together form a required chip guard 74 and the drill bits 72 together form a required drill 75.

Figure 8F:
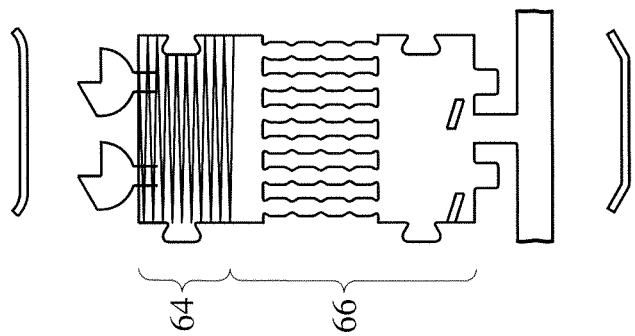
Figure 8E:
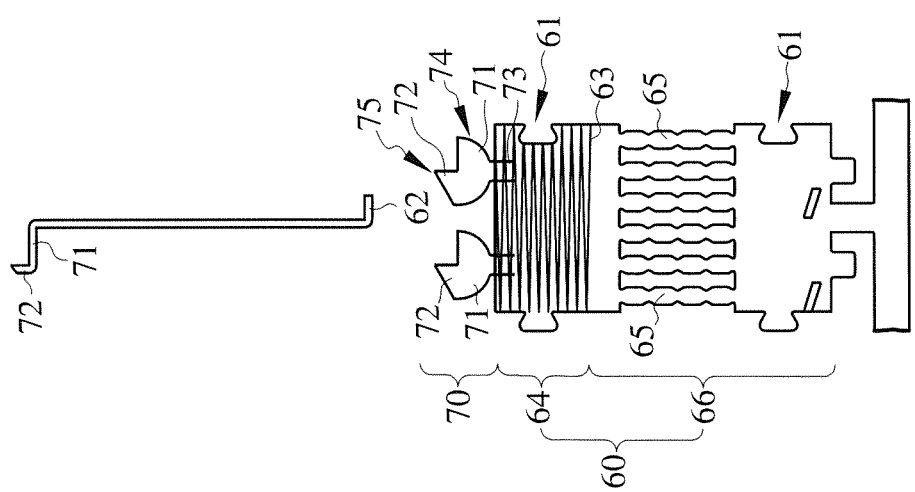
Figure 8H:
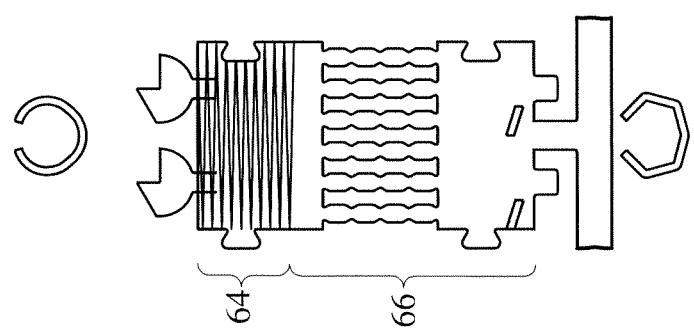
Figure 8I:
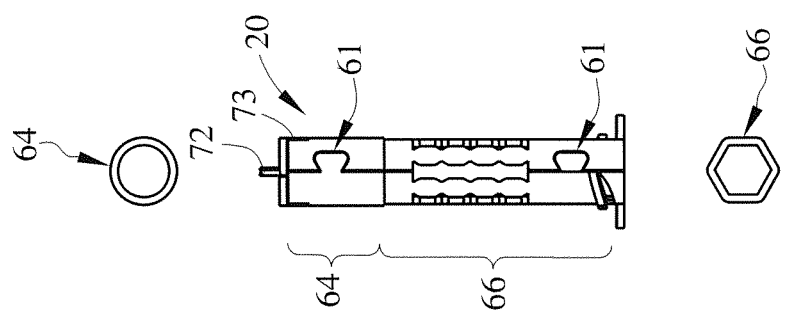

As shown in FIGS. 8F to 8H, when the steps shown in FIGS. 8A to 8E are completed, the thread forming zone 64 and the barrel body forming zone 66 are subjected to a series of stamping to respectively obtain a required configuration. For example, the thread forming zone 64 is formed into a near-cylindrical hollow body and the barrel body forming zone 66 is formed into a hexagonal hollow body internally defining a hexagonal bore. Finally, as shown in FIG. 8I, when the thread forming zone 64 and the barrel body forming zone 66 have been suitably shaped, the coupling devices 61 are closed to complete the self-drilling expansion fastener 20 of the present invention.

By forming through a series of punching and stamping, the self-drilling expansion fastener 20 can be easily and quickly completed with largely simplified procedures, shortened working time and lowered manufacturing cost.

What is claimed is:

1. A self-drilling expansion fastener being integrally formed of a sheet metal material for use with an externally threaded element to tightly lock multiple layers of sheet workpieces to one another, comprising:

an expansion structure having a plurality of internal threads and a plurality of force-distributing bars; and a drill structure being integrally formed at a head of the expansion structure; the drill structure including a chip guard connected to the expansion structure for covering the head of the expansion structure, and a drill forward projected from the chip guard for self-drilling a hole on the multiple layers of sheet workpieces, so that the expansion structure can be extended through the sheet workpieces and tightly received in the drilled hole with the force-distributing bars fully located behind the sheet workpieces;

whereby when the externally threaded element is screwed deeper into the expansion structure to mesh with the internal threads, the force-distributing bars are gradually pulled backward to expand outward and are finally compressed into a fully folded state to tightly press against an inner side of the multiple layers of sheet workpieces, so that the sheet workpieces are firmly locked together;

wherein the expansion structure is integrally formed to have an internally threaded body portion and a barrel body portion; the internal threads being formed in the internally threaded body portion; and the force-distributing bars being formed on the barrel body portion; and the internally threaded body portion is a cylindrical hollow body and the barrel body portion is a hexagonal hollow body internally defining a hex bore.

2. The self-drilling expansion fastener as claimed in claim 1, wherein the chip guard includes two side covers, which together cover the head of the expansion structure; and wherein the drill consists of two drill bits, which are forward projected from top surfaces of the two side covers.

3. The self-drilling expansion fastener as claimed in claim 1, wherein the barrel body portion includes at least one retaining wing for embedding in a peripheral wall of the drilled hole on an outermost sheet workpiece of the multiple layers of sheet workpieces, so that the self-drilling expansion fastener is firmly associated with the outermost sheet workpiece.

4. The self-drilling expansion fastener as claimed in claim 3, wherein the retaining wing is formed by outward stamping a wall of the barrel body portion, such that the retaining wing extends at an angle relative to a horizontal rear end of the barrel body portion.

5. The self-drilling expansion fastener as claimed in claim 1, wherein the expansion structure includes at least one stopper formed on a rear end thereof.

6. The self-drilling expansion fastener as claimed in claim 1, wherein the expansion structure further includes at least one coupling device; and the coupling device consisting of a lug portion and a notch portion correspondingly located opposite to the lug portion, such that the lug portion and the notch portion can be engaged with and locked to each other.

\* \* \* \* \*